(No Model.)   3 Sheets—Sheet 3.

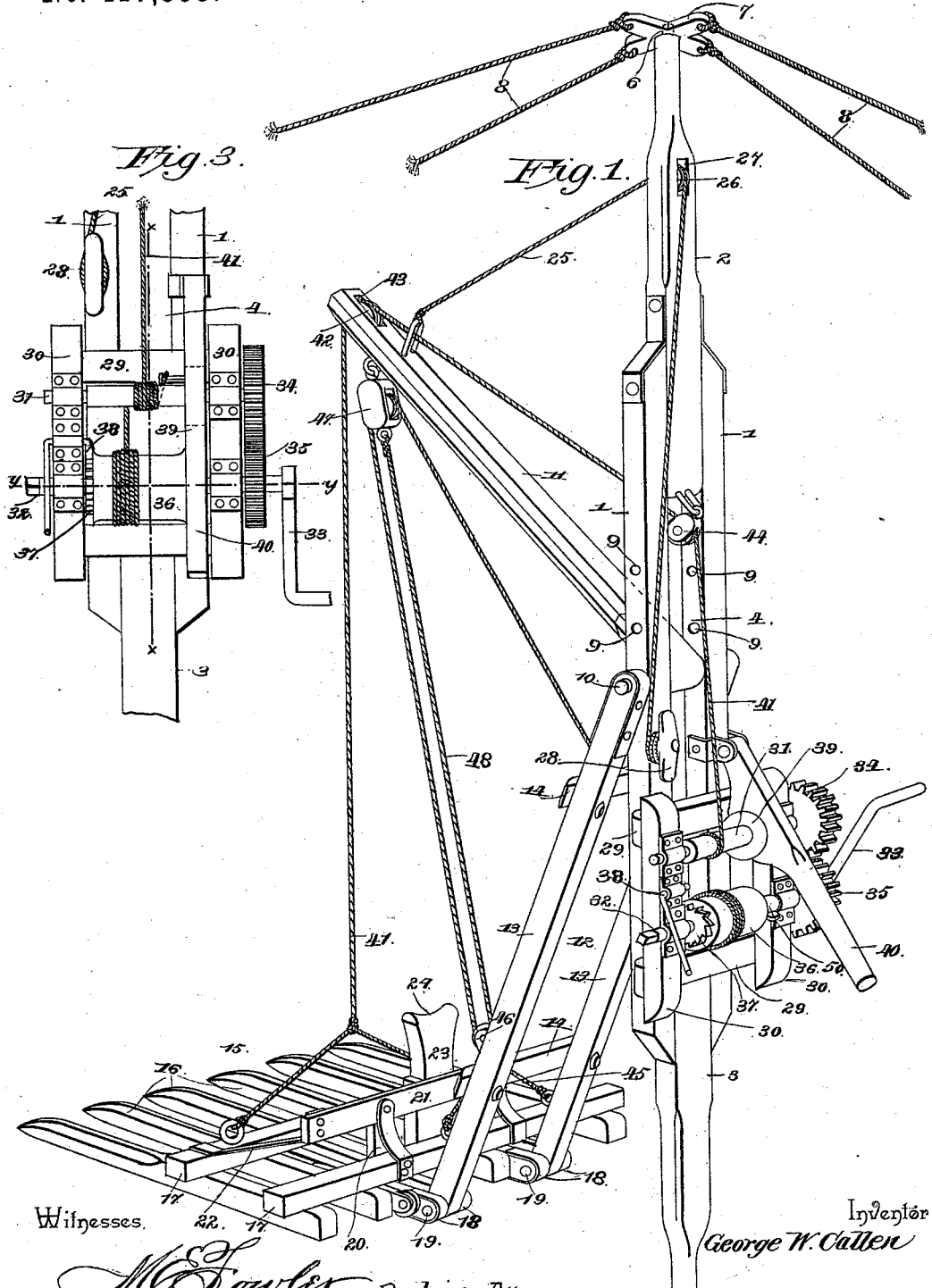

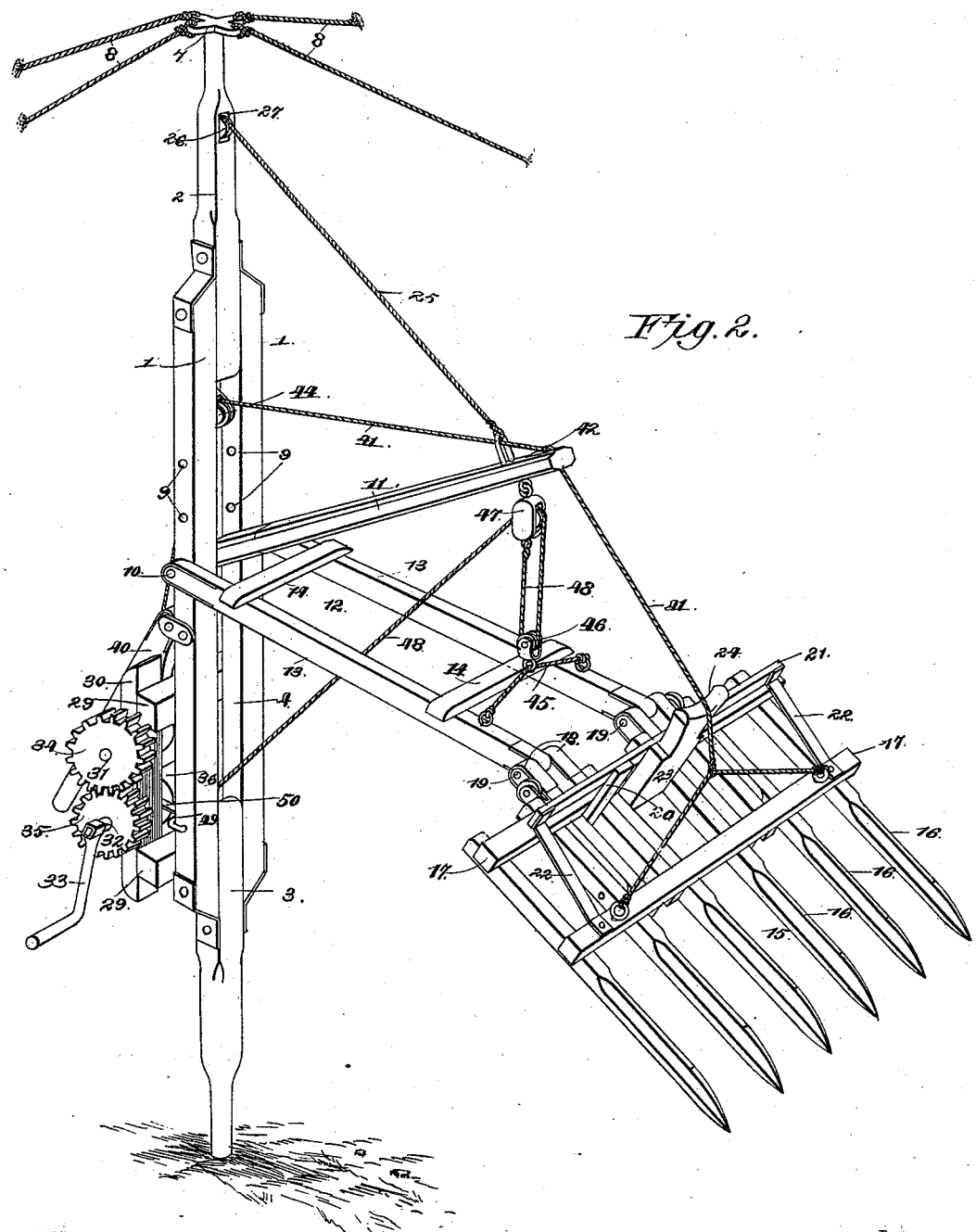

G. W. CALLEN.
HAY STACKER.

No. 417,353.   Patented Dec. 17, 1889.

Witnesses
M. Fowler
Wm Bagger

By his Attorneys,

Inventor
George W. Callen
C. A. Snow & Co.

UNITED STATES PATENT OFFICE.

GEORGE WASHINGTON CALLEN, OF PRINCETON, MISSOURI.

HAY-STACKER.

SPECIFICATION forming part of Letters Patent No. 417,353, dated December 17, 1889.

Application filed August 22, 1889. Serial No. 321,600. (No model.)

*To all whom it may concern:*

Be it known that I, GEORGE WASHINGTON CALLEN, a citizen of the United States, residing at Princeton, in the county of Mercer and State of Missouri, have invented a new and useful Hay-Stacker, of which the following is a specification.

This invention relates to hay-stackers; and it has for its object to provide a device which shall be capable of being conveniently operated by hand-power and by means of which hay may be elevated and stacked in a convenient and economical manner.

The invention consists in the improved construction, arrangement, and combination of parts, which will be hereinafter fully described, and particularly pointed out in the claims.

Figure 4:
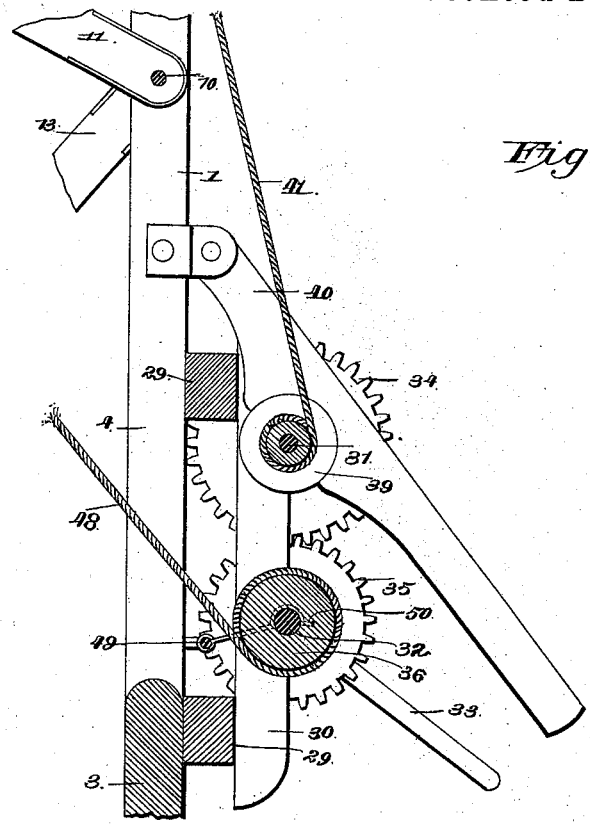
Figure 5:
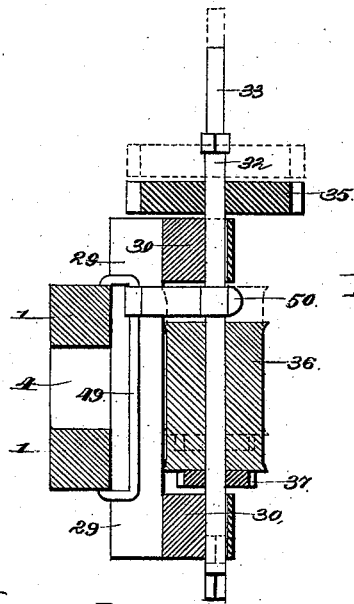

In the drawings hereto annexed, Figure 1 is a perspective view of my improved hay-stacker, showing the same in position for operation. Fig. 2 is a perspective view showing the stacker in position for dumping or discharging its load. Fig. 3 is a rear elevation. Fig. 4 is a vertical sectional view taken on the line $x$ $x$ in Fig. 3. Fig. 5 is a vertical transverse sectional view taken on the line $y$ $y$ in Fig. 3.

Like numerals of reference indicate like parts in all the figures.

The support of my improved hay-stacker consists of a vertical frame comprising a pair of side beams 1 1, the upper and lower ends of which are secured to the sides of the vertical top and bottom bars 2 3, thereby forming a frame of considerable height having a central vertical slot or opening 4 between the side beams 1 1. The lower end of the frame has a prong or point 5, adapted to enter the ground or to be journaled in a suitable socket, which may be placed upon the ground, and the upper end of the frame has a gudgeon 6, adapted to be journaled in a horizontal frame 7, which is cross-shaped and the ends of the arms of which are connected with the ground by means of guy-ropes 8, which serve to support the frame in a vertical position for operation. The lower ends of the guy-ropes may be attached to posts or stakes, which have not been shown in the drawings.

The side bars 1 1 of the main frame are provided with transverse aligned perforations 9, of which there may be any desired number, to provide for the vertical adjustment of a transverse pin or shaft 10, upon which is mounted an arm 11, which is hinged upon the said transverse shaft between the sides 1 1 of the frame.

12 designates a frame composed of side beams 13 13, connected by cross-bars 14. Said frame is hinged by means of its side beams 13 upon the projecting ends of the shaft 10 adjacent to the outer sides of the vertical frame-beams 1.

To the lower or outer end of the frame 12 is hinged the stack-platform 15. The latter is composed of a series of longitudinal bars or arms 16, connected by cross-bars 17 and having rearwardly-extending brackets 18, between which the lower ends of the side bars 13 of the frame 12 are inserted and hinged by means of transverse pins 19. The rear cross-bar 17 of the stacker-platform has uprights 20, connected by a guard-rail 21, from which braces 22 extend to the front cross-bar of said platform. A vertical post 23, having a concaved upper end 24, also extends from the rear cross-bar 17 in an upward direction above the guard-rail 21, to which latter it is suitably attached.

To the hinged arm 11, near its outer end, is attached a rope 25, which passes over a pulley 26, journaled in a slot 27 in the top bar 2 of the main frame and to a cleat 28 upon the rear side of the main frame, where the end of the said rope is made fast. By means of this rope the hinged arm 11 may be adjusted to and secured at any desired inclination.

The rear side of the main frame is provided with cross-pieces 29, the outer ends of which are connected by vertical bars 30, which afford bearings for the transverse shafts 31 and 32. The shaft 31, which is the upper one, is provided at its outer end with a spur-wheel 34, meshing with a pinion 35 upon the lower shaft 32. The latter has a crank 33, a winding-drum 36, and a ratchet-wheel 37, which latter is adapted to be engaged by a pawl 38, pivoted to one of the frame-bars 30. The upper shaft 31 has a brake-wheel 39, adapted to be engaged by a brake-lever 40, which is suitably hinged to one of the side beams 1 of the main frame.

Suitably attached to the front cross-bar 17 of the stacker-platform is a rope 41, which passes over a pulley 42, journaled in a slot 43 at the outer end of the hinged arm 11, thence through a block 44, mounted in the upper end of the slot 4 in the main frame, and thence down to the shaft 31, to which it is suitably attached.

To the lower end of the hinged frame 12 is attached a rope 45, centrally to which is secured a block 46. A block 47 is likewise attached to the under side of the hinged arm 11 near its outer end. To the under side of the block 47 is secured the end of the rope 48, which passes downwardly over the pulley and the block 46, thence upwardly over the pulley in the block 47, and from thence again in a downward direction to the drum 36 upon the shaft 32, to which it is suitably attached. The lower shaft 32 is mounted in such a manner as to be capable of sliding laterally in its bearings for the purpose of disengaging the spur-wheel 34 from the pinion 35 when desired, thus permitting the shafts 31 and 32 to rotate independently of each other when occasion shall require.

49 designates a metallic rod connecting the sides 1 1 of the main frame a short distance below the lower shaft 32, and having a pivoted tongue 50, adapted to rest against the said shaft 32 adjacent to the winding-drum 36, for the purpose of preventing the said shaft from sliding laterally in its bearings when the machine is in operation under ordinary circumstances.

The operation of my invention will be readily understood from the foregoing description, taken in connection with the drawings hereto annexed. Normally the stacking-platform rests upon the ground in a horizontal position, so as to admit of a quantity of hay being deposited upon the said platform by means of a horse-rake or in any other suitable well-known manner. The crank 33 is now operated by hand-power, thus rotating the shafts 31 and 32 and winding the ropes 41 and 48 upon the shaft 31 and the drum 36, respectively, and thus elevating the free end of the frame 12, carrying the hinged stacker-platform, and at the same time elevating the outer end of said platform, thus keeping the said platform in an approximately-horizontal position while it is being raised or elevated to the desired height. When this has been done, the main frame, with its attachments, may be swung around upon its pivots until the point is reached at which it shall be desired to dump or discharge the load. The rotation of the shaft 32 by means of the crank 33 is now continued until the concavity or recess 24 at the upper end of the uprights 23 of the stacker-platform bears against the rope 41, thus causing the stacker-platform to be tilted and the load to be discharged from the same.

Sometimes it may be found necessary in order to discharge the load at the proper elevation to move the shaft 32 laterally in its bearings until the pinion 35 and spur-wheel 34 are disengaged from each other, thus causing the shafts to rotate independently of each other. When this is done, the brake-lever 40 will be held in engagement with the brake-wheel 39 of the shaft 31 while the shaft 32 is further rotated by means of a crank 33. The free end of the hinged frame 12 will thereby be elevated, thus raising the rear end of the stacking-platform, tilting the latter, and discharging the load. The shafts 31 and 32 are then again thrown into gear with each other, and the hinged frame 12, with the stacker-platform, will be lowered for the purpose of receiving another load. By throwing the pawl 38 into engagement with the ratchet-wheel 37 it will be seen that the shaft 32, with its attachments, may be retained stationary at any desired point.

My improved stacking device may by making certain modifications in its construction, which will readily suggest themselves to any skilled mechanic, be advantageously used for a variety of hoisting and lifting purposes. It is simple in its construction, durable, and compact, and it has the additional advantage of being exceedingly light, so that it may be easily transported from place to place.

Having thus described my invention, what I claim, and desire to secure by Letters Patent, is—

1. In a hay-stacker, the combination of the vertically-slotted frame or support having gudgeons at its upper and lower ends, the adjustable arm hinged in the slot of said frame, a frame hinged to the outer sides of the supporting-frame, the stacker-platform hinged at the outer end of said hinged frame, and suitable operating mechanism, substantially as set forth.

2. In a hay-stacker, the combination of the vertically-slotted rotatable supporting-frame, the vertically-adjustable hinged arm, a stay-rope connecting the outer end of said arm adjustably with the main frame, a vertically-adjustable hinged frame, the stacker-platform hinged at the outer end of said hinged frame, and suitable operating mechanism, substantially as set forth.

3. In a hay-stacker, the combination of the vertically-slotted supporting-frame, the vertically-adjustable arm hinged in the slot of said frame, a stay-rope connecting the free end of said arm with the main frame, a vertically-adjustable hinged frame, the stacker-platform hinged at the outer end of the latter, and hoisting-ropes connecting the said hinged frame and the stacker-platform with separate winding-drums which are geared together, substantially as herein set forth.

4. The herein-described stacker-platform, composed of a series of longitudinal arms, cross-bars connecting the same, uprights extending vertically from the rear cross-bar, a guard-rail connecting the upper end of said uprights, braces connecting the said guard-rail with the front cross-bar, and an upright having a concavity or recess at its upper end, substantially as and for the purpose herein set forth.

5. In a hay-stacker, the combination of the vertically-slotted main frame, a vertically-adjustable hinged arm, a vertically-adjustable hinged frame, the stacker-platform hinged at the outer end of the latter and having an upright provided with a concavity or recess at its upper end, and the hoisting-ropes connecting the hinged frame and the stacker-platform with separate winding-drums which are geared together, the hoisting-rope attached to the stacker-platform being guided over a pulley at the outer end of the vertically-adjustable hinged arm, so as to come in contact with the recess at the upper end of the upright extending from the stacker-platform when the latter is being elevated, substantially as and for the purpose set forth.

6. In a hay-stacker, the combination of the vertically-slotted main frame, an arm hinged in the slot of the same by means of a transverse pin or shaft, a frame hinged or mounted upon the projecting ends of said shaft, the stacker-platform hinged at the outer end of said frame and having an upright provided with a concavity or recess at its upper end, a pair of shafts mounted in suitable bearings upon the rear side of the main frame, a hoisting-rope connecting a winding-drum upon the lower shaft with the free end of the hinged frame, a hoisting-rope connecting the upper shaft with the stacker-platform, the latter hoisting-rope being guided over a pulley at the outer end of the hinged arm, a stay-rope for the latter, a spur-wheel and pinion mounted upon the operating-shafts and meshing together, a brake-wheel mounted upon the upper shaft, a brake-lever hinged to the main frame and adapted to engage the said wheel, a ratchet-wheel mounted upon the lower shaft, and a pawl adapted to engage the said ratchet-wheel, substantially as and for the purpose set forth.

7. The combination of the operating-shafts, the spur-wheel and pinion mounted upon said shafts and meshing together, a winding-drum mounted upon the lower shaft, a transverse rod attached to the main frame parallel to the lower shaft, and a tongue mounted pivotally and sliding laterally upon the said guide-rod and adapted to rest against the lower shaft adjacent to the winding-drum, said lower shaft being adapted when the said tongue is raised out of contact with said shaft and winding-drum to be moved laterally in its bearings for the purpose of throwing the pinion upon said shaft out of gear with the spur-wheel upon the upper shaft, substantially as set forth.

8. The combination of the operating-shafts, the spur-wheel and pinion upon said shafts meshing together, the laterally-adjustable pivoted tongue adapted to rest against the lower shaft adjacent to winding-drum thereon for the purpose of preventing said shaft from being moved laterally in its bearings, a brake-wheel mounted upon the upper shaft, and a brake-lever hinged to the main frame and adapted to bear against the periphery of said wheel, as set forth.

In testimony that I claim the foregoing as my own I have hereto affixed my signature in presence of two witnesses.

GEORGE WASHINGTON CALLEN.

Witnesses:
WM. K. JOHNSON,
WM. A. STEWART.